(12) United States Patent
Peng et al.

(10) Patent No.: US 10,101,982 B2
(45) Date of Patent: Oct. 16, 2018

(54) METHODS FOR APPLICATION MANAGEMENT IN AN ELECTRONIC DEVICE SUPPORTING HARDWARE ACCELERATION

(71) Applicant: HTC Corporation, Taoyuan, Taoyuan County (TW)

(72) Inventors: Chung-Chen Peng, Taoyuan (TW); Tsung-Wei Lai, Taoyuan (TW); Ming-Chao Lee, Taoyuan (TW); Chi-Nan Lin, Taoyuan (TW); Yi-Chih Chou, Taoyuan, Taoyuan County (TW); Yu-Chi Huang, Taoyuan (TW); Jian-Chau Huang, Taoyuan (TW); Shang-Che Chen, Taoyuan (TW); Han-Kuan Yu, Taoyuan (TW); Shih-Ping Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 1222 days.

(21) Appl. No.: 14/075,512

(22) Filed: Nov. 8, 2013

(65) Prior Publication Data
US 2014/0215453 A1    Jul. 31, 2014

Related U.S. Application Data

(60) Provisional application No. 61/759,085, filed on Jan. 31, 2013.

(51) Int. Cl.
G06F 9/445        (2018.01)
G06F 8/61         (2018.01)

(52) U.S. Cl.
CPC ..................... *G06F 8/61* (2013.01)

(58) Field of Classification Search
None
See application file for complete search history.

(56) References Cited

U.S. PATENT DOCUMENTS

| | | | |
|---|---|---|---|
| 5,559,313 A * | 9/1996 | Claus ................... | G06Q 20/105 235/380 |
| 6,553,375 B1 * | 4/2003 | Huang ...................... | G06F 8/61 |
| 6,825,844 B2 * | 11/2004 | Hill ......................... | G06F 17/212 345/543 |
| 7,053,901 B2 * | 5/2006 | Huang ................... | G06T 15/005 345/503 |
| 7,127,707 B1 * | 10/2006 | Mishra .................... | G06F 8/423 717/136 |
| 8,806,644 B1 * | 8/2014 | McCorkendale ... | H04L 63/1416 713/188 |

(Continued)

*Primary Examiner* — Insun Kang
(74) *Attorney, Agent, or Firm* — Birch, Stewart, Kolasch & Birch, LLP

(57) ABSTRACT

Methods for application management in an electronic device are provided. It is first determined whether the application to be installed is listed in a first list, wherein the first list lists a set of applications which are hardware accelerable. The application is then marked as a hardware accelerable application in response to the application being listed in the first list. Thereafter, the application is installed, wherein a hardware acceleration function of the application is enabled to activate a hardware acceleration unit of the electronic device for hardware acceleration during executing the application being marked as the hardware accelerable application.

17 Claims, 5 Drawing Sheets

(56) References Cited

U.S. PATENT DOCUMENTS

| | | | | |
|---|---|---|---|---|
| 8,818,300 | B2* | 8/2014 | Falck | A61B 5/0028 |
| | | | | 340/539.12 |
| 9,154,555 | B2* | 10/2015 | Naaman | H04L 67/303 |
| 2003/0009748 | A1* | 1/2003 | Glanville | G06T 1/20 |
| | | | | 717/140 |
| 2007/0118724 | A1* | 5/2007 | Patel | G06F 9/30174 |
| | | | | 712/202 |
| 2007/0234285 | A1* | 10/2007 | Mendoza | G06F 8/51 |
| | | | | 717/114 |
| 2007/0261034 | A1* | 11/2007 | Chen | G06F 11/3466 |
| | | | | 717/130 |
| 2007/0288912 | A1* | 12/2007 | Zimmer | G06F 9/5027 |
| | | | | 717/148 |
| 2007/0294663 | A1* | 12/2007 | McGuire | G06F 8/45 |
| | | | | 717/108 |
| 2009/0111425 | A1* | 4/2009 | Forbes | G06Q 10/10 |
| | | | | 455/411 |
| 2009/0322764 | A1* | 12/2009 | Saini | G06T 15/005 |
| | | | | 345/501 |
| 2010/0262953 | A1* | 10/2010 | Barboni | G06F 8/61 |
| | | | | 717/120 |
| 2012/0166772 | A1* | 6/2012 | Ringseth | G06F 8/436 |
| | | | | 712/220 |
| 2012/0272224 | A1* | 10/2012 | Brackman | G06F 8/54 |
| | | | | 717/151 |
| 2013/0198325 | A1* | 8/2013 | Bourges-Sevenier | |
| | | | | G06F 9/5016 |
| | | | | 709/217 |
| 2013/0227521 | A1* | 8/2013 | Bourd | G06F 11/3604 |
| | | | | 717/110 |
| 2015/0178182 | A1* | 6/2015 | Mallya, Sr. | G06F 11/3672 |
| | | | | 717/124 |

* cited by examiner

124

| AP_Name | AP_PackageName |
|---|---|
| Apple daily | com.nextmediatw |
| APP1 | com.app1 |
| ... | ... |

| AP_Name | AP_PackageName |
|---|---|
| Taipei MRT Play Map | com.mark.taipeimrt |
| APP2 | com.app2 |
| ... | ... |

| Class Name | Class signature for dvm |
|---|---|
| android.view.SurfaceView | Landroid/view/SurfaceView |
| android.opengl.GLSurfaceView | Landroid/opngl/SurfaceView |
| android.graphic.Movie | Landroid/graphic/Movie |
| ... | ... |

| Class Name | Method |
|---|---|
| android.graphics.Canvas | drawPicture |
| android.graphics.Canvas | drawVertices |
| android.graphics.Canvas | setBitmap |
| ... | ... |
| android.graphics.Paint | setMaskFilter |
| android.graphics.Paint | setRasterizer |
| android.graphics.Paint | setXfermode |
| ... | ... |

FIG. 2D

METHODS FOR APPLICATION MANAGEMENT IN AN ELECTRONIC DEVICE SUPPORTING HARDWARE ACCELERATION

CROSS REFERENCE TO RELATED APPLICATIONS

This application claims the benefit of U.S. Provisional Application No. 61/759,085, filed Jan. 31, 2013, the entirety of which is incorporated by reference herein.

BACKGROUND OF THE INVENTION

Field of the Invention

The disclosure relates generally to management methods and related electronic devices, and, more particularly to methods for application management in an electronic device supporting hardware acceleration.

Description of the Related Art

Recently, electronic devices, such as mobile or handheld devices, have become more and more technically advanced and multifunctional. For example, a mobile device may receive email messages, have an advanced address book management application, allow for media playback, and have various other functions. Because of the conveniences of electronic devices with multiple functions, the devices have become necessities of life.

In recent years, there has been an exponential growth in applications used in an electronic device with a Google™ Android operating system, which has resulted in software programs, becoming widely available in supporting hardware acceleration. Beginning in Android 3.0 (API level 11), the Android 2D rendering pipeline is designed to better support hardware acceleration. Application developer is able to enabling hardware acceleration by defining the flags on its manifest or using proper APIs. Moreover, beginning in Android 4.0 (API level 14), the application's hardware acceleration is enabled in default if the application developer doesn't configure it specifically. During application execution, however, the hardware accelerations for all the applications being executed are all enabled or disabled after configuration. Moreover, not all of the applications support the hardware acceleration. For an application which not supports the hardware acceleration, enabling the hardware acceleration for this application during execution may result in a bad performance or may crash it.

BRIEF SUMMARY OF THE INVENTION

Methods for application management and related electronic devices are provided.

In an embodiment of a method for application management in an electronic device with a processing unit, it is determined, by the processing unit, whether the application to be installed is listed in a first list, wherein the first list lists a set of applications which are hardware accelerable. The application is then marked, by the processing unit, as a hardware accelerable application in response to the application being listed in the first list. Thereafter, the application is installed, by the processing unit, on the electronic device. A hardware acceleration function of the hardware accelerable application is enabled to activate a hardware acceleration unit of the electronic device for hardware acceleration during executing the hardware accelerable application.

An embodiment of an electronic device includes a storage unit, a hardware acceleration unit and a processing unit. The storage unit stores a first list listing a set of applications which are hardware accelerable. The processing unit which is coupled to the storage unit and the hardware acceleration unit determines whether an application to be installed is listed in the first list prior to installing the application, marks the application as a hardware accelerable application in response to the application being listed in the first list, and installs the application on the electronic device, and a hardware acceleration function of the hardware accelerable application is enabled to activate the hardware acceleration unit for hardware acceleration.

In another embodiment of a method for application management in an electronic device with a processing unit, it is determined, by the processing unit, whether an application to be executed is a hardware accelerable application. In response to the application being the hardware accelerable application, a hardware acceleration function of the application is enabled and executed with the enabled hardware acceleration function by the processing unit. In response to the application not being the hardware accelerable application, the hardware acceleration function of the application is disabled and executed without the hardware acceleration function by the processing unit. A hardware acceleration unit of the electronic device is activated for hardware acceleration when the hardware acceleration function of the application is being enabled.

Methods for application management may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein:

FIGS. 2A to 2D are schematic diagrams illustrating embodiments of examples of the lists of the invention;

DETAILED DESCRIPTION OF THE INVENTION

The following description shows several exemplary embodiments which carry out the invention. This description is made for the purpose of illustrating the general principles of the invention and should not be taken in a limiting sense. The scope of the invention is best determined by reference to the appended claims.

Methods for application management and related electronic devices are provided. Embodiments of the present disclosure provides a method for application management in an electronic device with a hardware acceleration unit, which can automatically determine whether or not the electronic device needs to enable a hardware acceleration function such as enabling GPU rendering by activating the hardware acceleration unit on an application.

Figure 1:
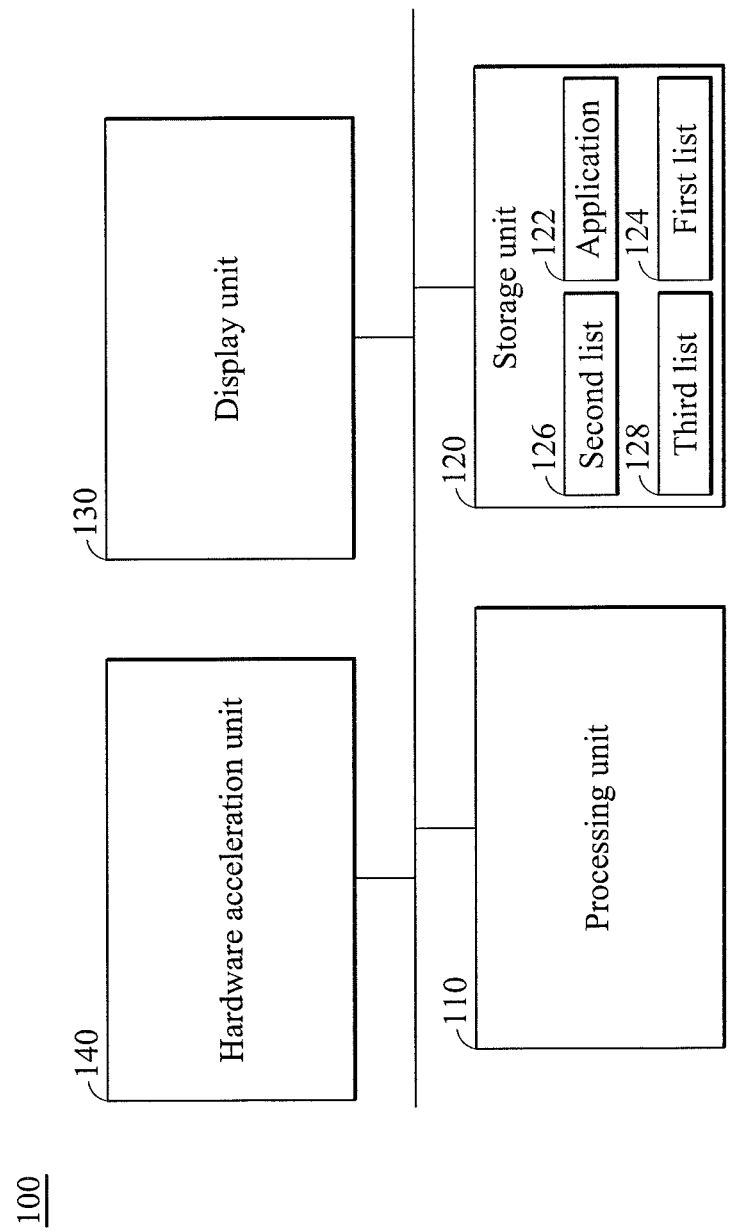
FIG. 1 is a block diagram illustrating the hardware architecture of an electronic device according to an embodiment of the invention.

FIG. 1 is a block diagram illustrating the hardware architecture of an electronic device according to an embodiment of the invention. The electronic device 100 may be a computer system such as a personal computer or a mobile and handheld device, such as a PDA, a PDA phone, a smart phone, a mobile phone, an MID, a laptop computer, a tablet computer, a car computer, a digital camera, a multi-media player, a game device, or any other type of mobile computational devices. The hardware architecture of the electronic device 100 contains a processing unit 110, a storage unit 120, a display unit 130 and a hardware acceleration unit 140. The processing unit 110 may be a general-purpose processor or a Micro-Control Unit (MCU) of the electronic device 100. The storage unit 120 may be a volatile memory, such as a Random Access Memory (RAM), a non-volatile memory, such as a flash memory, a hard disk, an optical disk, or any combination thereof, for storing related data and the program code or machine code, which when loaded and executed by the processing unit 110, may perform the respective functions described below. The storage unit 120 may also provide data to the display unit 130 for display. The storage unit 120 may store one or more application(s) 122 and a number of lists which can be used for indicating whether an application 122 is hardware accelerated. Each application may include a flag for indicating whether it is hardware accelerable. It is to be understood that, an application indicated as hardware accelerable (also referred to as a hardware accelerable application) indicates that the hardware acceleration unit 140 can be activated on this application for hardware acceleration while it is executing. Contrarily, an application indicated as not hardware accelerable (also referred to as a hardware unaccelerable application) indicates that the hardware acceleration unit 140 can't be activated on this application for hardware acceleration while it is executing.

The lists may comprise a first list 124, a second list 126 and a third list 128. Note that, the first list 124, also referred to a white list, lists a set of applications which are hardware accelerable. The second list 126, also referred to a black list, lists a set of applications which are not hardware accelerable. The third list 128, also referred to an unsupported list, lists a set of unsupported Application Programming Interfaces (APIs) or classes, wherein the unsupported APIs or classes are a set of APIs or classes which are not supported by the hardware acceleration function. For example, the first list 124 may list names of a set of hardware accelerable applications 122 which are determined as hardware accelerable, but it is not limited thereto. FIGS. 2A to 2D are schematic diagrams illustrating embodiments of examples of the lists of the invention.

FIG. 2A is a schematic diagram illustrating an embodiment of an example of the first list 124 of the invention. As shown in FIG. 2A, the first list 124 lists application names "AP_Name" and other respective data of a set of first applications which are hardware accelerable. If an application can be found a match, e.g. by the application name, from the first applications of the first list, it can be determined as a hardware accelerable application. FIG. 2B is a schematic diagram illustrating an embodiment of an example of the second list 126 of the invention. As shown in FIG. 2B, the second list 126 lists application names "AP_Name" and other respective data of a set of second applications which are not hardware accelerable. If an application can be found a match, e.g. by the application name, from the second list 126, it can be determined as not a hardware accelerable application (or referred to as a hardware unaccelerable application). FIGS. 2C and 2D are schematic diagram illustrating embodiments of an example of the third list 128 of the invention. As shown in FIG. 2C or 2D, the third list 128 may list class names "Class Name" and other respective data of a set of classes (FIG. 2C) or names of class and method and other respective data of a set of APIs (FIG. 2D) which are not supported by the hardware acceleration function. If classes or APIs used by an application can be found a match, e.g. by the class name or the method name, from the third list 128 shown in FIG. 2C or 2D, the application can be determined as not a hardware accelerable application (or referred to as a hardware unaccelerable application). Otherwise, if no match can be found from the list 128 for an application, the application can be determined as a hardware accelerable application. In addition, in some embodiments, the storage unit 120 may also store links to the lists, wherein content of the lists may be received from a server (not shown) remotely located on the Internet, or may be read out from another storage medium (not shown) accessible when coupled to the electronic device 100.

The display unit 130 may be a Cathode Ray Tube (CRT) screen, a Liquid Crystal Display (LCD), a plasma display panel, or the like, for displaying data, such as texts, figures, interfaces, and/or information, e.g. displaying a graphic user interface where the user may interact with a user interface presented therein. It is understood that, in some embodiments, the display unit 130 may be integrated with a touch-sensitive device (not shown). The touch-sensitive device has a touch-sensitive surface comprising sensors in at least one dimension to detect contact and movement of at least one object (input tool), such as a pen/stylus or finger near or on the touch-sensitive surface. Accordingly, users are able to input commands or signals via the graphic user interface presented therein.

The hardware acceleration unit 140 can perform hardware acceleration when it is activated. For example, the hardware acceleration unit 140 can be, for example but not limited to, a graphic processing unit (GPU) which can be activated for performing GPU rendering on one or more specific application(s) so as to display or render data on the display unit 130 quickly. Although not shown, the electronic device 100 may comprise other functional units, such as a keyboard/keypad, a mouse, a touchpad, or a communication unit, such as an Ethernet card/chipset, a Wireless-Fidelity (WiFi) card/chipset, a baseband chipset and a Radio Frequency (RF) chipset for cellular communications. The baseband chipset may contain multiple hardware devices to perform baseband signal processing, including analog to digital conversion (ADC)/digital to analog conversion (DAC), gain adjusting, modulation/demodulation, encoding/decoding, and so on. The RF chipset may receive RF wireless signals, convert the received RF wireless signals to baseband signals, which are processed by the baseband chipset, or receive baseband signals from the baseband chipset and convert the received baseband signals to RF wireless signals, which are later transmitted. The RF chipset may also contain multiple hardware devices to perform radio frequency conversion. For example, the RF chipset may comprise a mixer to multiply the baseband signals with a carrier oscillated in the radio frequency of the wireless communications system, wherein the radio frequency may be 900 MHz, 1900 MHz, or 2100 MHz utilized in WCDMA systems, or may be 900 MHz, 2100 MHz, or 2.6 GHz utilized in LTE systems, or others depending on the radio access technology (RAT) in use.

The processing unit 110 which is coupled to the storage unit 120, the display unit 130 and the hardware acceleration unit 140 can perform the method for application management of the present invention, which will be discussed further in the following paragraphs. To be more specific, the processing unit 110 can determine whether an application is hardware accelerable and create and maintain the aforementioned lists (e.g. the first, second and third lists) during installing the application and can also determine whether to perform hardware acceleration during executing the application.

Figure 3:
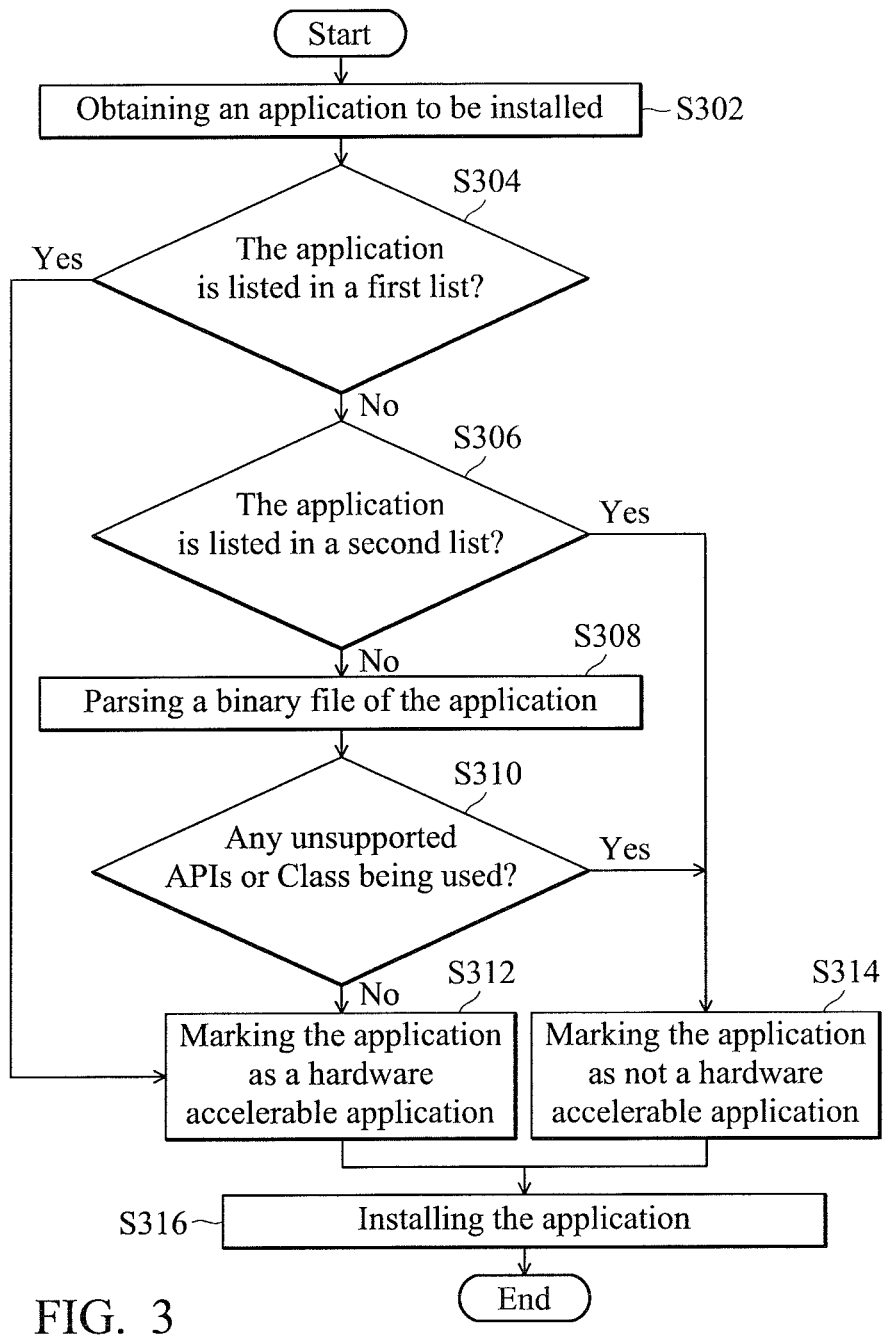
FIG. 3 is a flowchart of an embodiment of a method for application management of the invention.

FIG. 3 is a flowchart of an embodiment of a method for application management of the invention. The method for application management can be used for an electronic device, such as a PDA, a smart phone, a mobile phone, a laptop computer or a tablet computer. For example, the method for application management can be performed by the processing unit 110 of the electronic device 100 as shown in FIG. 1 during installing an application.

When a user requires installing an application from, for example, an application market on the Internet, an application to be installed is obtained (step S302) and it is then determined whether the application to be installed is listed in a first list (step S304), wherein the first list lists a set of applications which are hardware accelerable, such as the white list shown in FIG. 2A.

In response to the application being listed in the first list (Yes in step S304), which means that the application matches one of the set of applications which are hardware accelerable, step S312 is further performed to mark the application as a hardware accelerable application. For example, the application is associated with a hardware accelerable flag for indicating that it is hardware accelerable. Then, the application is installed on the electronic device 100 (step S316). In another embodiment, step S316 could be processed before step S304.

In response to the application not being listed in the first list (No in step S304), which means that the application does not match any of the set of applications which are hardware accelerable, in step S306, it is further determined whether the application is listed in a second list, wherein the second list lists a set of applications which are not hardware accelerable, such as the black list shown in FIG. 2B.

In response to the application being listed in the second list (Yes in step S306), which means that the application matches one of the set of applications which are not hardware accelerable, step S314 is further performed to mark the application as not the hardware accelerable application or mark as a hardware unaccelerable application. For example, the application is associated with a hardware unaccelerable flag for indicating that it is not hardware accelerable. Then, the application is installed on the electronic device 100 (step S316). In another embodiment, step S316 could be processed before step S304.

In response to the application not being listed in the first list and not being listed in the second list (No in step S306), which means that the application is a unknown application, it is then parsed or decoded a binary file of the application (step S308) and then determined whether the binary file of the application is using any unsupported APIs or classes (step S310), wherein the unsupported APIs or classes are a set of APIs or classes which are not supported by the hardware acceleration function. In one embodiment, the determination of whether the binary file of the application is using any unsupported APIs or classes may be performed by parsing the binary file of the application with a third list using a virtual machine running on the electronic device, wherein the third list lists the set of unsupported APIs and/or classes, such as the list 128 shown in FIG. 2C or 2D.

In response to determining that the binary file of the application uses one of the unsupported APIs and classes (Yes in step S310), which means that APIs or classes for the application matches one of the set of unsupported APIs or classes, step S314 is further performed to mark the application as not the hardware accelerable application or mark as a hardware unaccelerable application. For example, the application is associated with the hardware unaccelerable flag. Then, the application is installed on the electronic device 100 (step S316). In another embodiment, step S316 could be processed before step S304. In response to determining that the binary file of the application uses none of the unsupported APIs and classes (No in step S310), which means that APIs or classes for the application does not match any of the set of unsupported APIs and classes, step S312 is further performed to mark the application as the hardware accelerable application. For example, the application is associated with the hardware accelerable flag. Then, the application is installed on the electronic device 100 (step S316). In another embodiment, step S316 could be processed before step S304.

It is understood that, the hardware acceleration function of the hardware accelerable application will be enabled to activate the hardware acceleration unit 140 of the electronic device 100 for hardware acceleration during executing the hardware accelerable application. According to the method of the invention, after installation, each application may have a flag for indicating whether it is a hardware accelerable application so that the processing unit 110 may then automatically determine whether an application can perform the hardware acceleration during execution based on its flag.

Figure 4:
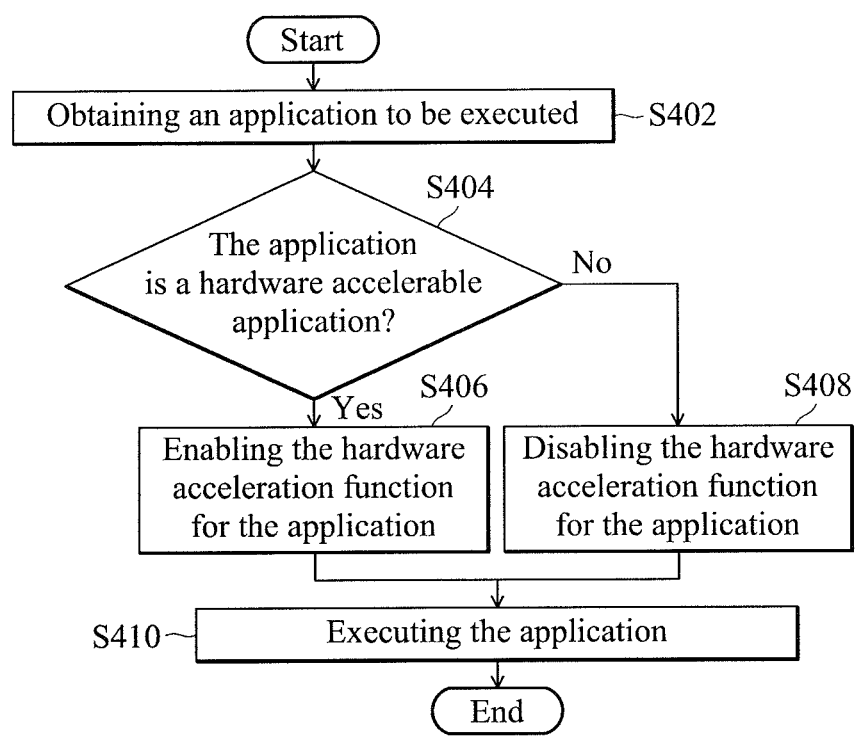
FIG. 4 is a flowchart of another embodiment of a method for application management of the invention.

FIG. 4 is a flowchart of another embodiment of a method for application management of the invention. The method for application management can be used for an electronic device, such as a PDA, a smart phone, a mobile phone, a laptop computer or a tablet computer. For example, the method for application management can be performed by the processing unit 110 of the electronic device 100 as shown in FIG. 1 during executing an application.

When a user requires executing or launching an application from, for example, the storage unit 120 or an application market on the Internet, an application to be executed is obtained (step S402) and it is then determined whether the application to be executed is a hardware accelerable application (step S404). In one embodiment, the determination of whether the application to be executed, e.g. from the storage unit 120, is a hardware accelerable application may comprise the steps of determining whether the application is associated with a hardware accelerable flag or a hardware unaccelerable flag, wherein the application is determined as the hardware accelerable application if it is associated with the hardware accelerable flag or determined as not the hardware accelerable application if it is associated with the hardware unaccelerable flag. In another embodiment, the determination of whether the application to be executed, e.g. from the application market on the Internet, is a hardware accelerable application may comprise the steps of determining whether the application is listed in a first list, such as the white list shown in FIG. 2A, which lists a set of applications which are hardware accelerable and it is determined that the application is the hardware accelerable application in response to the application being listed in the first list or it is determined that the application is not the hardware accelerable application in response to the application not being listed in the first list. The aforementioned determination step may further comprise the step of determining whether the application is listed in a second list, such as the black list shown in FIG. 2B, which lists a set of applications which are not hardware accelerable. It is determined that the application is not the hardware accelerable application in response to the application being listed in the second list or it is determined that the application is the hardware accelerable application in response to the application not being listed in the second list. The aforementioned determination step may further comprise the step of determining whether a binary file of the application is using any unsupported Application Programming Interfaces (APIs) or classes in response to the application not being listed in the first list and not being listed in the second list. It is determined that the application is not the hardware accelerable application in response to determining that the binary file of the application uses one of the unsupported APIs or classes; otherwise, it is determined that the application is the hardware accelerable application in response to the binary file of the application uses none of the unsupported APIs and classes. In one embodiment, the determination of whether the binary file of the application is using any unsupported APIs or classes may be performed by parsing the binary file of the application with a third list using a virtual machine running on the electronic device, wherein the third list lists the set of unsupported APIs and/or classes, such as the list 128 shown in FIG. 2C or 2D.

In response to the application being the hardware accelerable application (Yes in step S404), a hardware acceleration function of the application is enabled (step S406). In response to the application not being the hardware accelerable application (No in step S404), the hardware acceleration function of the application is disabled (step S408). Therefore, the application is then executed with or without the hardware acceleration function based on the setting of the hardware acceleration function (step S410). When the hardware acceleration function of an application is being enabled during execution, the hardware acceleration unit 140 will be activated for hardware acceleration for this application so that the hardware accelerable application can be executed with the hardware acceleration function. When the hardware acceleration function of an application is being disabled during execution, the hardware acceleration unit 140 will be deactivated for this application so that the hardware unaccelerable application will be executed without the hardware acceleration function.

Taking the Google android operating system as a preferred example, while in application (or referred to as "app") installation process, the processing unit 110 activates a PackageManager to determine whether an app to be installed has the ability to enable a hardware acceleration, e.g. GPU rendering. First, it checks whether a package name of the application matches one of the items listed in the white list, such as the list shown in FIG. 2A. If so, it then marks this app as a hardware accelerable application, and then the detection process ends. Similarly, if the app is not in the white list, the PackageManager continues to check whether it's one of the items listed in the black list, such as the list shown in FIG. 2B. If so, it then marks this as the hardware unaccelerable app and the detection process ends.

If the app exists neither in the white list, nor in the black list, the PackageManager will scan or parse the binary file of the app, e.g. classes.dex, through a virtual machine, for example: the Dalvik which is the virtual machine running on a Google™ android operating system device. The scanning or parsing process is to check whether the app is using any unsupported Classes or APIs. If the application uses one of the unsupported Classes or APIs, then it marks this app as the hardware unaccelerable application, then the detecting process ends. In some embodiments, the scanning or parsing process may comprise the following steps: determining if an apk of the app use the unsupported APIs (defined in the specified classes) by determining whether the apk of the app includes the APIs (with same name) which are defined in the given classes or the APIs (with same name) which are defined in the class which inherits from the given classes in the unsupported API list, such as the list shown in FIG. 2D; and determining if the apk uses the unsupported Classes defined in the unsupported class list, such as the list shown in FIG. 2C.

Later, when user launches the app, other services, such as ActivityManager and WindowManager, may be activated by the processing unit 110 to check whether the app is associated with the hardware accelerable flag through PackageManager. If it is a hardware accelerable app associated with the hardware accelerable flag, the WindowManager will trigger the hardware acceleration unit 140 (e.g. the GPU) to perform hardware acceleration (e.g. the GPU rendering process) for this application.

It is to be understood that, although the Google™ android operating system is used as an exemplary operation system in the embodiments for easy understanding, another operating system which is also supported hardware acceleration of the executed applications may be used instead, such as a Microsoft™ Window operating system, an Apple™ iOS operating system, or the like supporting hardware acceleration of the executed applications, and the invention is not limited thereto.

In some embodiments, the processing unit 110 may further determine to disable or enable the hardware acceleration function of the first application respectively if a predetermined criterion for the electronic device has been met when enabling or disabling the hardware acceleration function of the first application. The predetermined criteria may correspond to performance of the electronic device, for example. In one embodiment, in adding to checking the application's ability to enable GPU rendering during application installation process if the hardware acceleration unit 140 is a GPU, the hardware-acceleration flag can be dynamically adjusted at run time, depending on some symptoms are happened, e.g. the texture size overflow, or the performance is not good. Once the electronic device 100 detects these events, it can fine tune the flag, and then enable or disable GPU rendering for this app automatically.

In some embodiments, in addition to checking the application's ability to enable GPU rendering during application installation process, some runtime mechanisms to overcome GPU rendering limitations can also be implemented. For example, GPU has more strict texture size limitation that large texture cannot be rendering normally. The electronic device can detect texture size overflow at runtime based on maximal texture size the electronic device supported and split this large texture into several small parts under texture size limitations.

In some embodiments, there are also some cases that using GPU render is smoother, but has different user experience. The typical example is WEBVIEW™. When applications use WEBVIEW™ to render content, the scrolling performance might not be smooth enough. However, enable GPU rendering improved its scrolling performance but it also caused contents incomplete at the end of page, a symptom also happened in Browser that use WEBVIEW™. The electronic device ensures the best user experience by adjusting the scrolling speed to get a balance between performance and content display when enabling GPU render.

Therefore, the methods for application management in an electronic device and related electronic devices of the application can check each application to mark whether it is hardware accelerable during application installation and then can automatically and dynamically determine whether to activate the hardware acceleration unit for performing hardware acceleration on the applications during application execution, thus enhancing the system performance and providing better user experience.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A method for application management in an electronic device with a processing unit and a graphic processing unit (GPU) which is deactivated, comprising:
   receiving, by the processing unit, an application to be installed;
   parsing, by the processing unit, the application to detect whether a binary file of the application is using any unsupported Application Programming Interfaces (APIs) or classes, wherein the unsupported APIs or classes are a set of APIs or classes which do not support hardware acceleration;
   installing, by the processing unit, the application with a first flag which marks the application as hardware accelerable by the GPU on the electronic device when none of the unsupported APIs or classes is detected in the binary file of the application; and
   installing, by the processing unit, the application with a second flag which marks the application as not hardware accelerable by the GPU on the electronic device when one of the unsupported APIs or classes is detected in the binary file of the application,
   wherein the first flag causes the processing unit to activate the GPU for hardware acceleration when the application with the first flag is being executed.

2. The method of claim 1, further comprising:
   prior to parsing the application to be installed, determining, by the processing unit, whether the application to be installed is listed in a first list, wherein the first list lists a set of applications which are hardware accelerable by the GPU;
   installing, by the processing unit, the application with the first flag in response to the application being listed in the first list;
   determining, by the processing unit, whether the application is listed in a second list in response to the application not being listed in the first list, wherein the second list lists a set of applications which are not hardware accelerable by the GPU; and
   installing, by the processing unit, the application with the second flag in response to the application being listed in the second list.

3. The method of claim 2, wherein the determination of whether the binary file of the application is using any unsupported APIs or classes is performed by parsing the binary file of the application with a third list using a virtual machine running on the electronic device, wherein the third list lists the set of unsupported APIs and/or classes.

4. The method of claim 2, further comprising:
   adding the application marked with the second flag in the second list in response to determining that the binary file of the application uses one of the unsupported APIs or classes; and
   adding the application marked with the first flag in the first list in response to determining that the binary file of the application uses none of the unsupported APIs and classes.

5. The method of claim 1, wherein the activation of the GPU enables GPU rendering.

6. An electronic device, comprising:
   a storage device;
   a graphic processing unit (GPU), wherein the GPU is deactivated; and
   a processing circuit coupled to the storage device and the GPU,
   wherein the processing circuit receives an application to be installed, parses the application to detect whether a binary file of the application is using any unsupported Application Programming Interfaces (APIs) or classes, installs the application with a first flag which marks the application as hardware accelerable by the GPU on the electronic device when none of the unsupported APIs or classes is detected in the binary file of the application and installs the application with a second flag which marks the application as not hardware accelerable by the GPU on the electronic device when one of the unsupported APIs or classes is detected in the binary file of the application,
   wherein the unsupported APIs or classes are a set of APIs or classes which do not support hardware acceleration and the first flag causes the processing circuit to activate the GPU for hardware acceleration when the application with the first flag is being executed by the processing circuit.

7. The electronic device of claim 6, wherein the storage device further stores a first list listing a set of applications which are hardware accelerable by the GPU and a second list listing a set of applications which are not hardware accelerable by the GPU, and prior to parsing the application to be installed, the processing circuit further retrieves the first list from the storage device, determines whether the application to be installed is listed in the first list, installs the application with the first flag in response to the application being listed in the first list, retrieves the second list from the storage device and determines whether the application is listed in the second list in response to the application not being listed in the first list, and installs the application with the second flag in response to the application being listed in the second list.

8. The electronic device of claim 7, wherein the processing circuit further determines whether the binary file of the application is using any unsupported APIs or classes by parsing the binary file of the application with a third list using a virtual machine running on the electronic device, wherein the third list lists the set of unsupported APIs and/or classes.

9. The electronic device of claim 7, wherein the processing circuit further determines to add the application marked with the second flag in the second list in response to determining that the binary file of the application uses one of the unsupported APIs or classes and to add the application marked with the first flag in the first list in response to determining that the binary file of the application uses none of the unsupported APIs and classes.

10. The electronic device of claim 9, wherein the processing circuit further determines whether a first application to be executed is marked with the first flag, wherein the processing circuit further activates the GPU for executing the first application in response to the first application being marked with the first flag, or deactivates the GPU for executing the first application in response to the first application not being marked with the first flag.

11. The electronic device of claim 10, wherein the processing circuit further determines to deactivate or activate the GPU when executing the first application respectively if a predetermined criteria for the electronic device has been met when the GPU is being activated or deactivated, wherein the predetermined criteria corresponds to performance of the electronic device.

12. A method for application management in an electronic device with a processing unit and a graphic processing unit (GPU) which is deactivated, comprising:
receiving, by the processing unit, an application to be executed, wherein the application has a flag;
parsing, by the processing unit, the application to detect whether a binary file of the application is using any unsupported APIs or classes, wherein the unsupported Application Programming Interfaces (APIs) or classes are a set of APIs or classes which do not support hardware acceleration by the GPU;
marking, by the processing unit, the application with a first flag which marks the application as hardware accelerable by the GPU when none of the unsupported APIs or classes is detected in the binary file of the application;
marking, by the processing unit, the application with a second flag which marks the application as not hardware accelerable by the GPU when one of the unsupported APIs or classes is detected in the binary file of the application;
executing, by the processing unit, the application with the GPU activated in response to the application being marked with the first flag; and
executing, by the processing unit, the application without activating the GPU in response to the application being marked with the second flag.

13. The method of claim 12, further comprising:
determining, by the processing unit, whether the application is listed in a first list, wherein the first list lists a set of applications which are hardware accelerable; and
executing, by the processing unit, the application with the GPU activated in response to the application being listed in the first list.

14. The method of claim 13, further comprising:
determining, by the processing unit, whether the application is listed in a second list in response to the application not being listed in the first list, wherein the second list lists a set of applications which are not hardware accelerable; and
executing, by the processing unit, the application without activating the GPU in response to the application being listed in the second list.

15. The method of claim 14, wherein the determination of whether the binary file of the application is using any unsupported APIs or classes is performed by parsing the binary file of the application with a third list using a virtual machine running on the electronic device, wherein the third list lists the set of unsupported APIs and/or classes.

16. The method of claim 14, further comprising:
adding the application marked with the second flag; and
adding the application marked with the first flag in the first list.

17. The method of claim 14, further comprising:
when the GPU is being activated or deactivated during executing the application, deactivating or activating, by the processing, the GPU respectively if a predetermined criteria for the electronic device has been met, wherein the predetermined criteria corresponds to performance of the electronic device.

* * * * *